United States Patent
Shimazu et al.

(10) Patent No.: US 7,793,551 B2
(45) Date of Patent: Sep. 14, 2010

(54) LOAD SENSOR WITH SHOCK RELAXATION MATERIAL TO PROTECT SEMICONDUCTOR STRAIN SENSOR

(75) Inventors: Hiromi Shimazu, Kashiwa (JP); Yohei Tanno, Hitachinaka (JP); Hiroyuki Ohta, Tsuchiura (JP); Ryuji Takada, Tsuchiura (JP); Takayuki Shimodaira, Ryugasaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 7 days.

(21) Appl. No.: 12/184,426

(22) Filed: Aug. 1, 2008

(65) Prior Publication Data

US 2009/0031819 A1 Feb. 5, 2009

(30) Foreign Application Priority Data

Aug. 3, 2007 (JP) ............................. 2007-202454

(51) Int. Cl.
*G01B 7/16* (2006.01)
(52) U.S. Cl. .......................................... 73/777; 73/760
(58) Field of Classification Search ............ 73/760–860
See application file for complete search history.

(56) References Cited

U.S. PATENT DOCUMENTS

| | | | | |
|---|---|---|---|---|
| 4,389,896 A | * | 6/1983 | Babcock | 73/784 |
| 4,429,579 A | * | 2/1984 | Wilhelm | 73/768 |
| 4,804,053 A | * | 2/1989 | Nordstrom | 177/211 |
| 4,894,938 A | * | 1/1990 | Davis | 42/1.01 |
| 5,147,213 A | * | 9/1992 | Funk et al. | 439/266 |
| 6,345,974 B1 | * | 2/2002 | Kawasaki et al. | 425/149 |
| 6,446,510 B1 | * | 9/2002 | Kurtz et al. | 73/796 |
| 6,508,775 B2 | * | 1/2003 | McKenzie et al. | 601/2 |
| 6,605,006 B2 | * | 8/2003 | Mason | 473/252 |
| 6,951,137 B2 | * | 10/2005 | Smith et al. | 73/761 |
| 2003/0109812 A1 | * | 6/2003 | Corl et al. | 601/2 |
| 2007/0151356 A1 | * | 7/2007 | Sumigawa et al. | 73/777 |

FOREIGN PATENT DOCUMENTS

| | | |
|---|---|---|
| JP | 04-329328 A | 11/1992 |
| JP | U-6-69758 | 3/1993 |
| JP | 10-009936 A | 1/1998 |
| JP | 10-038713 | 2/1998 |
| JP | 2005-114443 | 4/2005 |
| JP | 2006-220574 A | 8/2006 |
| JP | 2007-255953 | 10/2007 |
| JP | 2007-263781 | 10/2007 |

OTHER PUBLICATIONS

Office Action in Japanese Patent Appln. 2007-202454, dated Mar. 2, 2010 (and English language translation) [3 pages].

* cited by examiner

*Primary Examiner*—Max Noori
(74) *Attorney, Agent, or Firm*—Antonelli, Terry, Stout & Kraus, LLP.

(57) ABSTRACT

The invention provides a load sensor which is driven by a low electric power consumption, can measure at a high precision, and has a high reliability without being broken. The load sensor is structured such that a detection rod for detecting a strain is provided in an inner portion of a hole formed near a center of a pin via a shock relaxation material and a semiconductor strain sensor is provided in the detection rod, in a load sensor detecting a load applied to the pin from a strain generated in an inner portion of the pin.

18 Claims, 11 Drawing Sheets

LOAD DETECTING DIRECTION a

LOAD DETECTING DIRECTION a

LOAD SENSOR WITH SHOCK RELAXATION MATERIAL TO PROTECT SEMICONDUCTOR STRAIN SENSOR

BACKGROUND OF THE INVENTION (1) Field of the Invention

The present invention relates to a load sensor which can detect a load at a high precision.

(2) Description of Related Art

As a technique detecting a load applied to each of mechanical parts constructing a machine, there has been known a pin type load sensor using a pin for coupling the parts used in a coupling portion of the machine as a load sensor, as shown in JP-A-10-38713. The pin type load sensor is structured such as to measure a strain of the pin generated by a load application by a strain measuring apparatus so as to detect the load. In this case, a metal resistance type strain gauge is used as the strain measuring apparatus.

However, in the case of the pin type load sensor in which the conventional strain gauge is used as the strain measuring apparatus, there is a problem that a zero point fluctuation of a strain gauge output is great at a time of being incorporated into a mechanical product. Further, since the conventional strain gauge is of a metal resistance type, an electric power consumption is great by being driven by a battery, so that there is a problem that the battery is consumed in a moment. Further, in the case of the load sensor utilizing the strain gauge, a wiring from the strain gauge to an amplifier tends to be affected by a noise, and there is a problem that an SN ratio is lowered.

Accordingly, in order to solve the problems, the inventors of the present invention have invented a pin type load sensor making use of a semiconductor strain sensor shown in JP-A-2005-114443, for achieving a pin type load sensor which has a small zero point fluctuation of an output, has a high noise resistance, and can be driven by a battery for a long time at a low electric power consumption. The semiconductor strain sensor uses an impurity diffusion resistance (hereinafter, refer to as a diffusion resistance) obtained by introducing an impurity to a single crystal silicon substrate as a strain sensitive resistance, and has a feature that a strain sensitivity is high and a zero point fluctuation is very small. Further, an output of the semiconductor strain sensor is such a great voltage that can detect the load without amplifying a signal by an amplifier or the like, and has a feature of being hard to be affected by the noise.

As shown in the prior art, in the case of the pin type load sensor using the strain gauge, since the strain sensitivity is low in the strain gauge, it is necessary to detect by amplifying the strain of the pin generated by the load application. Accordingly, a large hole is provided in an inner portion of the pin, the strain gauge is provided in an inner wall, and the strain generated in the inner wall is directly measure. In other words, the structure is made such that the strain at the strain measuring position in the pin inner portion is enlarged.

Further, there has been known a technique of putting a detection block into a hole of the pin so as to measure a strain of the detection block, however, in this case, the detection block has a complicated structure in such a manner that the strain of the pin can be amplified by the detection block. Further, the inner wall of the pin and the detection block directly comes into contact with each other, whereby the load applied to the pin is directly transmitted to the detection block, and the strain at the strain measuring position is enlarged.

However, in the case of the load sensor using the semiconductor strain sensor, since a main part of the semiconductor strain sensor is constituted by a single crystal silicon substrate, there is a risk that the strain sensor is broken if an excessive strain is generated in a pin type load cell at a time of applying a shock or the like. Accordingly, in the case that the semiconductor strain sensor is used in the pin type load cell, it is an important object to structure such that the excessive strain is not generated at the strain measuring position of the semiconductor strain sensor.

BRIEF SUMMARY OF THE INVENTION

Accordingly, an object of the present invention is to provide a load sensor which is driven by a low electric power consumption, can measure at a high precision, and has a high reliability without being broken.

The object mentioned above can be achieved by providing a detection rod for detecting a strain in an inner portion of a hole formed near a center of a pin via a shock relaxation material and providing a semiconductor strain sensor in the detection rod, in a load sensor detecting a load applied to the pin from a strain generated in an inner portion of the pin.

Specifically, in accordance with the present invention, there is provided a load sensor including a pin having a hole provided in a region including a neutral axis, a detection rod provided in an inner portion of the hole, a semiconductor strain sensor provided in the detection rod, and a shock relaxation material provided between the detection rod and the pin in the inner portion of the hole.

In the load sensor in accordance with the present invention, it is preferable that the detection rod is provided in the region including the neutral axis of the pin.

In the load sensor in accordance with the present invention, it is preferable that Young's modulus of the shock relaxation material is lower than Young's modulus of the pin and the detection rod.

In the load sensor in accordance with the present invention, it is preferable that a material of the shock relaxation material is an epoxy resin, and it is preferable that a material of the detection rod is a metal.

Further, it is preferable that the material of the detection rod is the same as the material of the pin.

In the load sensor in accordance with the present invention, it is preferable that a cross sectional shape of the detection rod is a square, and it is preferable that a cross sectional shape of the detection rod is a flat plate.

In the load sensor in accordance with the present invention, it is preferable that a longitudinal direction of the detection rod is in parallel to a longitudinal direction of the pin.

Further, it is preferable that the semiconductor strain sensor is provided in such a manner as to detect a shear strain of the detection rod, and it is preferable that the semiconductor strain sensor is provided with a diffusion layer on a surface of a silicon substrate, and is constructed by a bridge circuit constituted by four diffusion layers on the same substrate surface. In this case, the diffusion layer formed on the surface of the silicon substrate is constituted by a P type diffusion layer, and the bridge circuit is constructed by two diffusion resistances in which a longitudinal direction of the P type diffusion layer is in parallel to a direction <110> of a silicon single crystal, and two P type diffusion layers which are perpendicular thereto. Further, it is preferable that the direction <110> of the silicon single crystal of the strain sensor is arranged in parallel to a direction of 45 degree with respect to the longitudinal direction of the pin. Further, it is preferable that power supply lines of the two or more strain sensors are held in common in the inner portion of the pin, and the number of the wiring drawn out to an outer portion of the pin from the two or more strain sensors is obtained by a formula (number of sensors×2)+2.

In the load sensor in accordance with the present invention, it is preferable that the detection rod is constituted by a rectangular column having a square cross sectional shape, and the strain sensors are provided in two orthogonal surfaces of the rectangular columns.

In the load sensor in accordance with the present invention, it is preferable that the detection rod is constituted by a circular column, and the strain sensor is provided at least on one surface of the circular column.

Further, in accordance with the present invention, there is provided a manufacturing method of a load sensor including a step of attaching a semiconductor strain sensor to a detection rod, a step of inserting the detection rod attaching the semiconductor strain sensor thereto into a hole provided in a region including a center shaft of a pin, and a step of filling a resin in the hole of the pin so as to form a shock relaxation material.

In accordance with the present invention, since the load applied to the pin is applied to the detection rod via the shock relaxation material, it is possible to relax the strain generated in the detection rod more than the strain generated in the inner wall of the pin, and even in the case that the excessive strain is generated in the pin such as the case that the shock load is applied or the like, it is possible to achieve the pin type load sensor having a high reliability without breaking the semiconductor strain sensor.

Other objects, features and advantages of the invention will become apparent from the following description of the embodiments of the invention taken in conjunction with the accompanying drawings.

DETAILED DESCRIPTION OF THE INVENTION

A description will be given below of embodiments in accordance with the present invention with reference to the accompanying drawings.

First Embodiment

First, a description will be given of a first embodiment in the present invention with reference to FIGS. 1 and 2.

Figure 1:
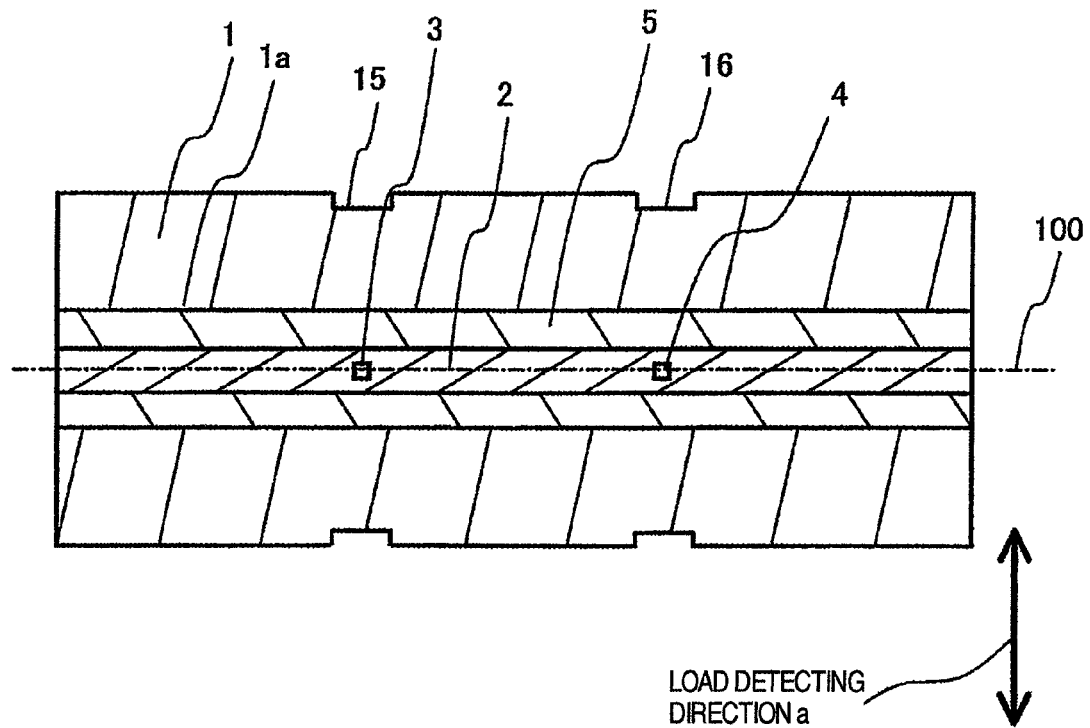
FIG. 1 is a view showing a vertical cross sectional structure of a major portion of a load sensor in accordance with a first embodiment of the present invention.
Figure 2:
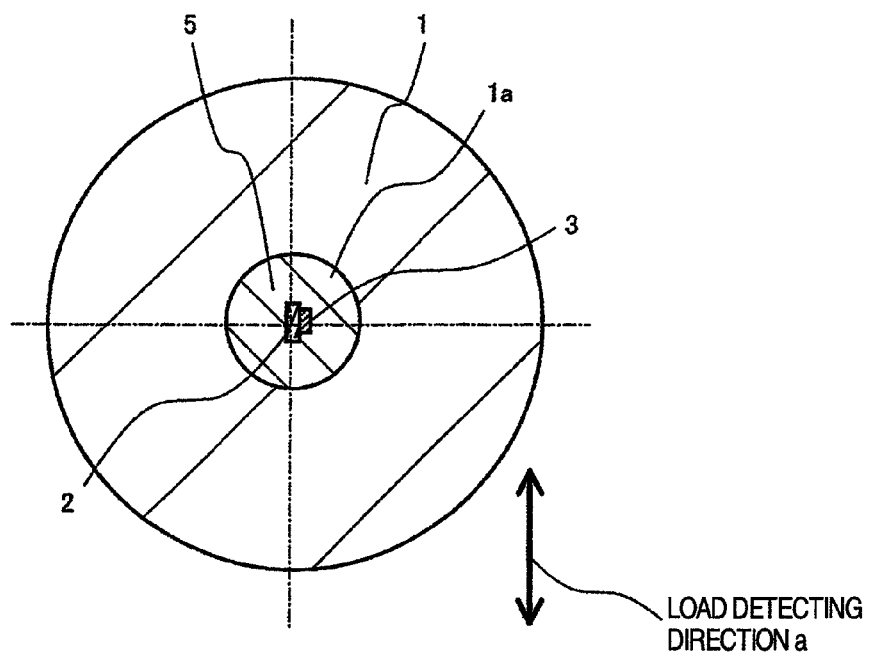
FIG. 2 is a view showing a transverse cross sectional structure of the major portion of the load sensor in accordance with the first embodiment of the present invention.

FIGS. 1 and 2 respectively show a vertical cross sectional structure and a transverse cross sectional structure of a load sensor in accordance with the present embodiment. In the load sensor in accordance with the present embodiment shown in FIGS. 1 and 2, a hole 1a is provided near a center of a pin 1, and a detection rod 2 for detecting a strain is provided in an inner portion of the hole 1a via a shock relaxation material 5. The detection rod 2 is provided with semiconductor strain sensors 3 and 4 each constituted by a silicon substrate.

In this case, the detection rod 2 is arranged near a neutral axis 100 of the pin 1, and a longitudinal direction of the detection rod 2 is in parallel to a longitudinal direction of the pin 1. In FIGS. 1 and 2, the description is given of a case that a cross sectional shape of the detection rod 2 is a flat plate shape, however, the detection rod 2 may be formed as a rectangular columnar shape or a circular columnar shape.

Further, Young's modulus of a material of the shock relaxation material 5 forming the shock relaxation layer of the pin 1 is lower than Young's modulus of a material of the pin 1 and the detection rod 2. For example, this structure can be achieved by setting the material of the shock relaxation material 5 to an epoxy resin, setting the material of the pin 1 and the detection rod 2 to a metal.

In this case, a measurement error caused by a heat strain is suppressed by making the detection rod 2 by the same material as that of the pin 1.

Further, the semiconductor strain sensors 3 and 4 are structured by forming a diffusion layer on a surface of a silicon substrate, and is structured such that a bridge circuit is formed by four diffusion layers formed on the same substrate surface.

Figure 7:
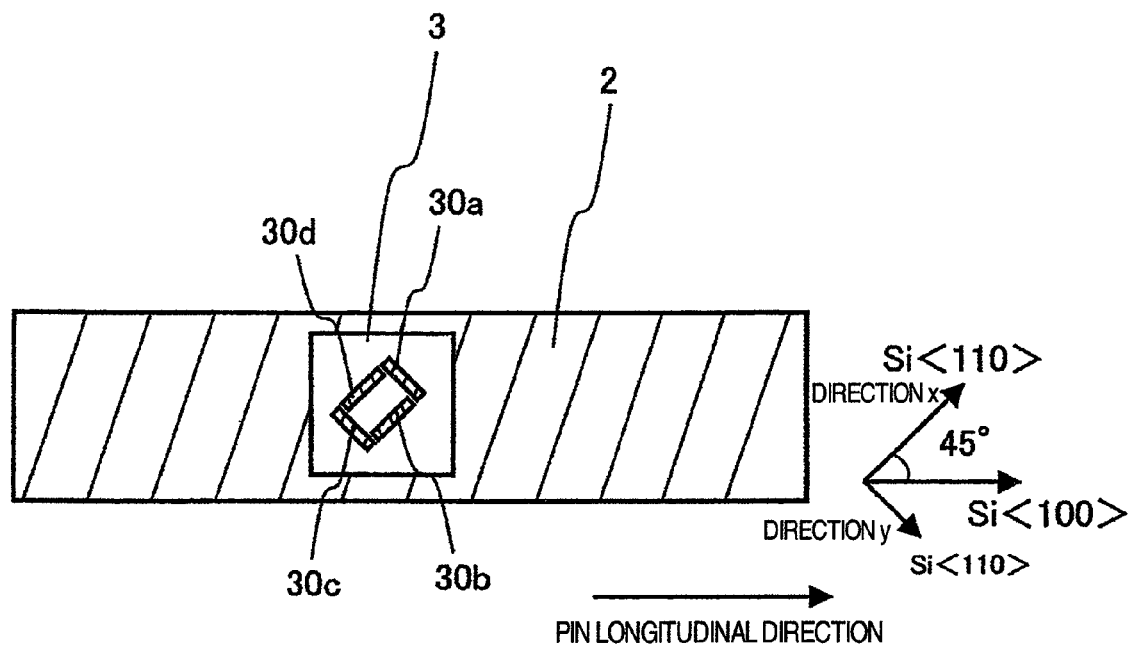
FIG. 7 is a view showing a strain detecting portion of a load sensor in accordance with the present invention.

An enlarged view of a strain detection portion in the present embodiment is shown in FIG. 7. The semiconductor strain sensor 3 is provided at a desired position of the strain detection rod 2. Further, the semiconductor strain sensor 3 is constituted by a silicon single crystal substrate, and four diffusion layers 30a, 30b, 30c and 30d are formed on the same substrate surface, for example, as shown in FIG. 7. The bridge circuit is formed by these four diffusion layers.

In this case, four diffusion layers 30a, 30b, 30c and 30d are constituted by a P type diffusion layer, and the bridge circuit is constructed by two diffusion layers in which a longitudinal direction of the P type diffusion layer is in parallel to a direction <110> of the silicon single crystal, and two P type diffusion layers which are perpendicular thereto. Further, the direction <110> of the silicon single crystal of the semiconductor strain sensors 3 and 4 is arranged in parallel to a direction which is 45 degree with respect to the longitudinal direction of the pin.

Next, a description will be given of an operation and an effect in accordance with the present embodiment.

In accordance with the load sensor of the present embodiment, since the load applied to the pin 1 is applied to the detection rod 2 via the shock relaxation material 5, it is possible to relax the strain generated in the detection rod than the strain generated in the inner wall of the pin 1. Even in the case that an excessive strain is generated in the pin 1 such as a case that the shock load is applied or the like, it is possible to achieve a pin type load sensor having a high reliability without breaking the semiconductor strain sensor.

In the load sensor in accordance with the present embodiment, since the stress applied to the pin 1 is relaxed by the shock relaxation material 5 so as to be transmitted to the detection rod 2, and the detection rod 2 is deformed in the same degree as the pin 1, the semiconductor strain sensors 3 and 4 can accurately detect the stress applied to the pin in such a manner as to separate per directing directions, by measuring the strain of the detection rod 2. This makes use of the structure in which the detection rod 2 has the longitudinal direction in the same direction as the longitudinal direction (an axial direction) of the pin 1 and the detection rod 2 is deformed in the same manner as the pin 1. Further, since the stress is relaxed by the shock relaxation material 5, the stress applied to the strain sensor is small, and it is possible to prevent the strain sensor from being broken.

In the case that the strain sensor is provided in the inner wall of the hole of the pin 1 such as the conventional structure, there can be considered to provide the shock relaxation material between the inner wall of the pin 1 and the strain sensor, however, a thickness of the shock relaxation material is limited, and it is impossible to enlarge an effect of the shock relaxation. Further, if the semiconductor strain sensors 3 and 4 are provided in the layered shock relaxation material 5 without setting the detection rod, the stress applied to the semiconductor strain sensors 3 and 4 becomes complicated, the force is applied from two shafts in a cross sectional direction of the pin, and it is impossible to detect only the strain in a desired detecting direction.

Further, it is possible to suppress a bending deformation of the detection rod 2 even in the case that a bending deformation is generated in the pin, by arranging the detection rod 2 near the neutral axis of the pin 1, and it is possible to suppress the measurement error of the semiconductor strain sensors 3 and 4 provided in the detection rod 2 from being generated.

Further, it is possible to easily generate the same deformation as the deformation generated in the pin in the detection rod 2, by setting the longitudinal direction of the detection rod 2 in parallel to the longitudinal direction of the pin 1.

Further, it is possible to effectively relax the strain generated in the detection rod 2 by setting the Young's modulus of the material of the shock relaxation material 5 lower to the Young's modulus of the material of the detection rod 2.

Further, if the material of the shock relaxation material 5 is set to the epoxy resin, it is possible to fill the liquid epoxy resin in a gap of the hole, and thereafter harden. Accordingly, there can be obtained an effect that a manufacturing method is easy and a cost can be lowered.

Further, since a rigidity of the detection rod 2 becomes small by forming the cross sectional shape of the detection rod 2 as the flat plate shape, the strain tends to be generated, so that this shape is effective in the case of the pin type load sensor detecting a small load.

Further, since the semiconductor strain sensor is structured such that the diffusion layers are formed on the surface of the silicon substrate, and the bridge circuit constituted by four diffusion layers is constructed on the same substrate surface, it is easy to suppress a temperature drift. Further, since the bridge circuit is constructed by one chip, it is sufficient to install only one strain sensor in the detection rod. Accordingly, since it is not necessary to align the resistances constructing the bridge circuit, there can be obtained an effect that it is easy to manufacture, and a cost can be reduced on the basis of a shortening of a manufacturing time.

Further, since the diffusion layer formed on the surface of the silicone substrate is constituted by the P type diffusion layer, and the bridge circuit is constructed by two diffusion layers in which the longitudinal direction of the P type diffusion layer is in parallel to the direction <110> of the silicon single crystal, and two P type diffusion layers which are perpendicular thereto, there is obtained an effect that a sensitivity of the semiconductor strain sensors 3 and 4 is improved. In other words, since the semiconductor strain sensors can be actuated as a four-active bridge circuit, it is possible to detect the strain generated in the detection rod at a high sensitivity.

In this case, a description will be given of one example of a load detecting method by the pin type load sensor with reference to FIGS. 17 and 18. A shear load is applied to the pin type load sensor from a vertical direction to the longitudinal direction of the pin 1. Specifically, loads 64 and 66 having the same direction are applied to support surfaces 61 and 63 of the pin 1, and a load 65 having an opposite direction to the loads 64 and 66 is applied to an application surface 62. Accordingly, a shear deformation is generated in regions 67 and 68 in an inner portion of the pin 1. In other words, in the case that the pin 1 is exposed to the shear load, the shear deformation is generated in the detection rod 2 provided in the inner portion of the pin 1.

In the case that the shear deformation is generated as mentioned above, a compression strain and a tensile strain are respectively generated in two orthogonal shafts in directions which are at 45 degree with respect to the longitudinal direction of the pin. It is possible to detect these strains by the semiconductor strain sensors 3 and 4 so as to calculate the load.

Accordingly, since the direction <110> of the silicon single crystal of the semiconductor strain sensors 3 and 4 is arranged in parallel to the direction which is at 45 degree with respect to the longitudinal direction of the pin, as shown in FIG. 7, it is possible to detect the shear strain generated in the pin 1 at a higher sensitivity. In other words, in the case that the shear strain caused by the shear deformation is generated in the longitudinal direction of the pin 1, a vertical strain component in the direction of 45 degree with respect to the longitudinal direction comes to a two-axis strain field in which the tensile strain is generated in one direction (a direction x), and the compression strain is generated in the vertical direction thereto (a direction y), and the vertical strain becomes maximum.

In the case that the bridge circuit is constructed by two diffusion layers in which the longitudinal direction is in parallel to the direction <110> of the silicon single crystal (Si<110>), and two P type diffusion layers which are vertical thereto, there is a feature that a strain sensitivity in parallel and vertical directions to the direction <110> is great in the both, and a code of the strain sensitivity is inverted. Accordingly, there is an advantage that it is possible to detect the shear strain at a higher sensitivity by arranging the P type diffusion layer which is parallel and vertical to the direction <110> of the silicon single crystal, in parallel to the longitudinal direction and the directions x and y in which the vertical strain becomes maximum.

Figure 8:
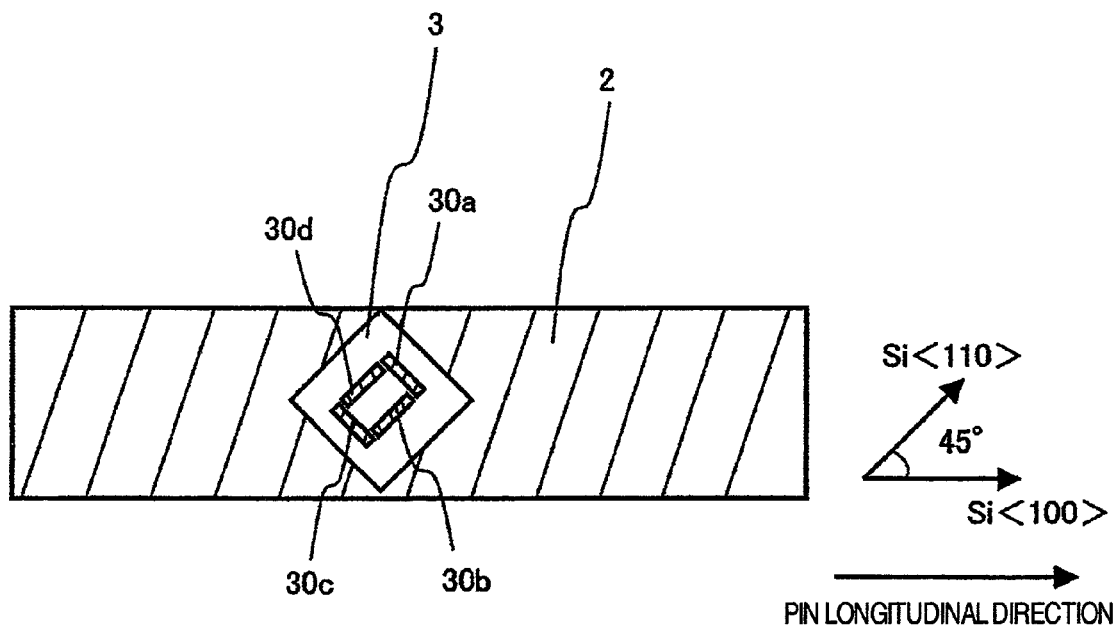
FIG. 8 is a view showing a modified example of the strain detecting portion of the load sensor in accordance with the present invention.

In this case, FIG. 7 shows the case that each of the lines of the outer shape of the semiconductor silicon substrate is in parallel to the direction <100> of the silicon single crystal (Si<100>), however, the semiconductor strain sensor may be structured, as shown in FIG. 8, such that each of the lines of the outer shape is in parallel to the direction <110> of the silicon single crystal (Si<110>).

Figure 9:
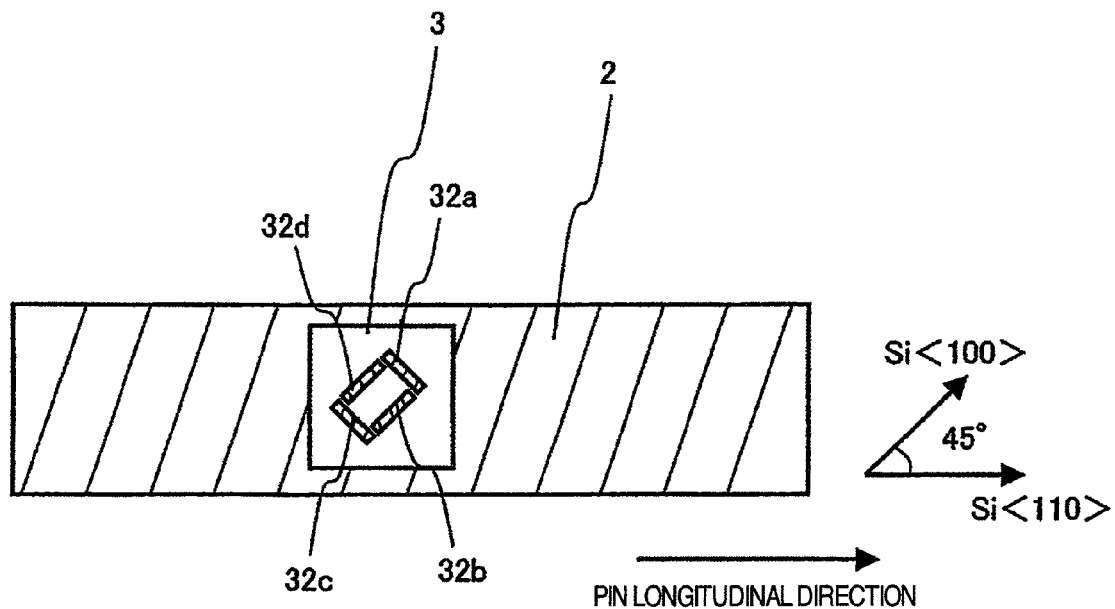
FIG. 9 is a view showing a modified example of the strain detecting portion of the load sensor in accordance with the present invention.

Further, in the present embodiment, there is shown the semiconductor strain sensors 3 and 4 in which the bridge circuit is constructed by two diffusion layers which are in parallel to the direction <110> of the silicon single crystal, and two P type diffusion layers which are perpendicular thereto, however, the same effect can be obtained by forming the semiconductor strain sensors 3 and 4 in which the bridge circuit is constructed by two diffusion layers which are in parallel to the direction <100> of the silicon single crystal, and two N type diffusion layers which are perpendicular thereto, and arranging the direction <100> of the silicon single crystal of the semiconductor strain sensors 3 and 4 in parallel to the direction which is at 45 degree with respect to the longitudinal direction of the pin 1, as shown in FIG. 9. In this case, it is desirable to arrange the direction <100> of the silicon single crystal of the semiconductor strain sensor in parallel to the direction which is at 45 degree with respect to the longitudinal direction of the pin. Accordingly, it is possible to detect the shear deformation of the detection rod 2 caused by the load applied to the pin, at a high sensitivity.

In this case, as shown in FIGS. 7 and 8, in the diffusion layer of the semiconductor strain sensor, the bridge circuit is manufactured by the P type diffusion layer which is vertical and parallel to the direction <110> of the silicon single crystal, whereby there is an advantage that the sensitivity with respect to the strain in the surface outside direction becomes approximately zero, it is easy to detect only the strain of the detection rod, and the measurement error becomes small.

Figure 10:
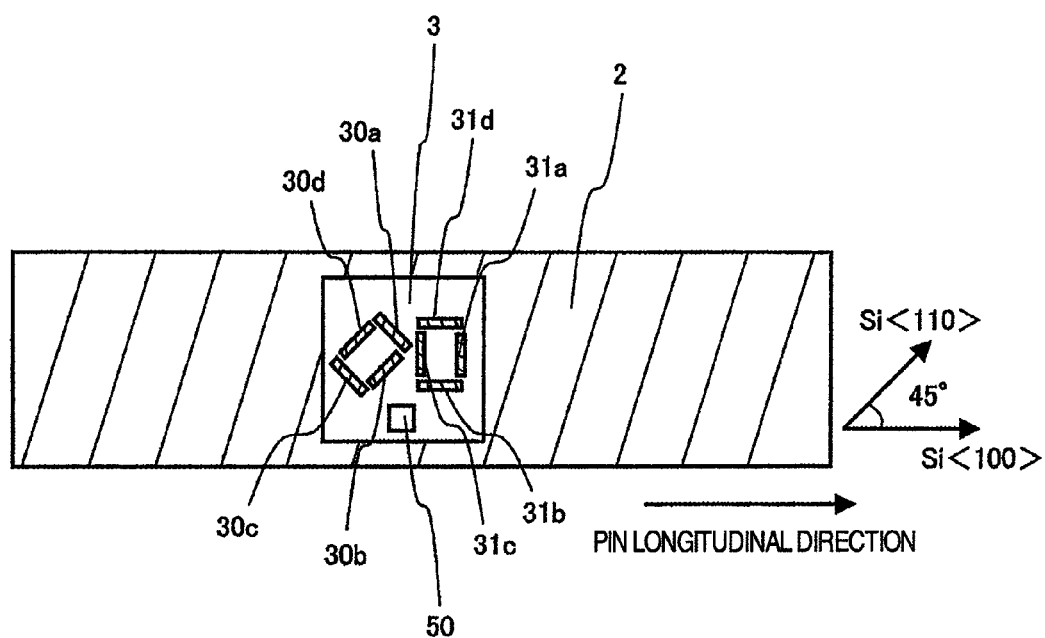
FIG. 10 is a view showing a modified example of the strain detecting portion of the load sensor in accordance with the present invention.

Further, as shown in FIG. 10, two bridge circuits may be provided in the semiconductor strain sensor 3 provided in the detection rod 2. In other words, there are provided a bridge circuit formed by two diffusion layers 30*a* and 30*c* in which a longitudinal direction is in parallel to the direction <110> of the silicon single crystal (Si<110>), and two P type diffusion layers 30*b* and 30*d* which are perpendicular thereto, and a bridge circuit formed by two diffusion layers in which a longitudinal direction is in parallel to the direction <100> of the silicon single crystal, and two N type diffusion layers which are perpendicular thereto, on the same substrate. Further, there is an advantage that it is possible to detect the shear deformation of the detection rod by the bridge circuits 30*a*, 30*b*, 30*c* and 30*d*, and detect the bending deformation of the detection rod by the bridge circuits 31*a*, 31*b*, 31*c* and 31*d*, respectively by arranging the semiconductor strain sensor in such a manner as to set the direction Si<100> in parallel to the longitudinal direction of the pin, and it is possible to more accurately calculate the load on the basis of a calculation of a result of these outputs.

Further, it is possible to correct an output fluctuation caused by the temperature in the case that the present load sensor is used under an environment that the temperature is changed, by providing a temperature sensor 50, for example, by a P-N junction, on the same substrate of the semiconductor strain sensor 3, whereby it is possible to more accurately detect the load.

In this case, as shown in FIGS. 7 and 8, in the diffusion layer of the semiconductor strain sensor, since the bridge circuit is manufactured by the P type diffusion layer which is vertical and parallel to the direction <110> of the silicon single crystal, the sensitivity with respect to the strain in the surface outside direction becomes approximately zero, so that there is an advantage that it becomes easy to detect only the strain of the detection rod, and the measurement error becomes small.

Further, as shown in FIG. 10, two bridge circuits may be provided in the semiconductor sensor 3 provided in the detection rod 2. In other words, there are provided the bridge circuit formed by two diffusion layers 30*a* and 30*c* in which the longitudinal direction is in parallel to the direction <110> of the silicon single crystal (Si<110>), and two P type diffusion layers 30*b* and 30*d* which are perpendicular thereto, and the bridge circuit formed by two diffusion layers in which the longitudinal direction is in parallel to the direction <100> of the silicon single crystal, and two N type diffusion layers which are perpendicular thereto, on the same substrate. Further, there is the advantage that it is possible to detect the shear deformation of the detection rod by the bridge circuits 30*a*, 30*b*, 30*c* and 30*d*, and detect the bending deformation of the detection rod by the bridge circuits 31*a*, 31*b*, 31*c* and 31*d*, respectively by arranging the semiconductor strain sensor in such a manner as to set the direction Si<100> in parallel to the longitudinal direction of the pin, and it is possible to more accurately calculate the load on the basis of the calculation of the result of these outputs.

Further, it is possible to correct the output fluctuation caused by the temperature in the case that the present load sensor is used under the environment that the temperature is changed, by providing the temperature sensor 50, for example, by the P-N junction, on the same substrate of the semiconductor strain sensor 3, whereby it is possible to more accurately detect the load.

In this case, in FIG. 10, there is shown the case that the semiconductor strain sensor is arranged in such a manner that the direction Si<100> is in parallel to the longitudinal direction of the pin, however, the semiconductor strain sensor may be arranged in such a manner that the direction Si<110> becomes in parallel to the longitudinal direction of the pin, by rotating the stain sensor at 45 degree. In this case, it is possible to detect the shear deformation of the detection rod by the bridge circuits 31*b*, 31*c* and 31*d*, and detect the bending deformation of the detection rod by the bridge circuits 30*a*, 30*b*, 30*c* and 30*d*, respectively.

Figure 11:
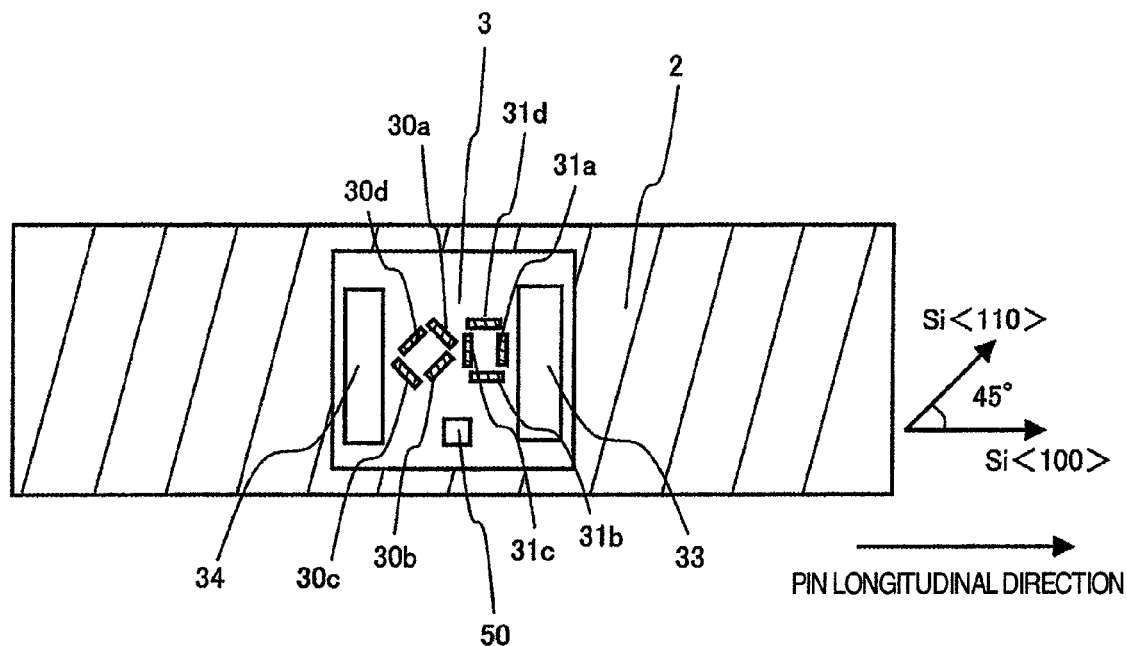
FIG. 11 is a view showing a modified example of the strain detecting portion of the load sensor in accordance with the present invention.

Further, as shown in FIG. 11, amplifiers 33 and 34 for amplifying the output of the bridge circuit may be provided on the same substrate of the semiconductor strain sensor 3 provided in the detection rod 2. Although being not always necessary, a noise resistance is improved by detecting the output of the sensor in a state of amplifying by the nearest amplifier. Further, since there is no fear that the structure of the load sensor is complicated by providing the amplifier on the same substrate, and the output is immediately amplified, there is an advantage that the noise resistance is further improved.

In this case, in FIG. 11, since there is shown the case that two bridge circuits are provided on the semiconductor strain sensor 3, two amplifiers are provided, however, one amplifier may be provided per one bridge circuit.

Figure 18:
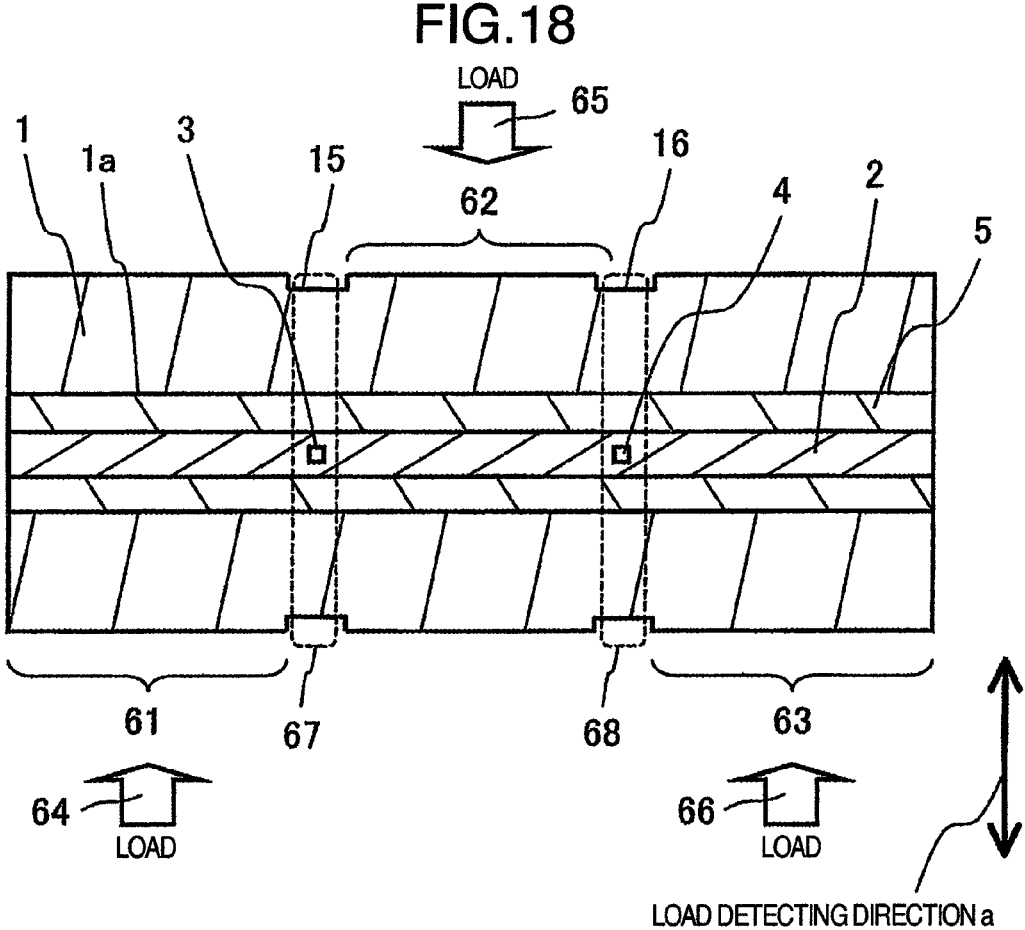
FIG. 18 is a view showing a load applying direction of the load sensor in accordance with the present invention.

In this case, in the present embodiment, the support surfaces 61 and 63 and the application surface 62 are defined as shown in FIG. 18, however, the same effect can be obtained even in the case that the support surface and the application surface are exchanged. The semiconductor strain sensors 3 and 4 can detect the load at a high sensitivity by being provided in the region in which the direction of the load applied to the detection rod is inverted, that is, in the regions 67 and 68 in which the shear strain is generated.

Further, a boundary between the support surfaces 61 and 63 and the application surface 62 becomes definite by providing the outer peripheral grooves 15 and 16 in the outer periphery of the pin in the regions 67 and 68 in which the direction of the load applied to the pin 1 is inverted, whereby it is possible to stably generate the shear deformation of the detection rod 2, and it is possible to detect the load at the high precision.

Figure 19:
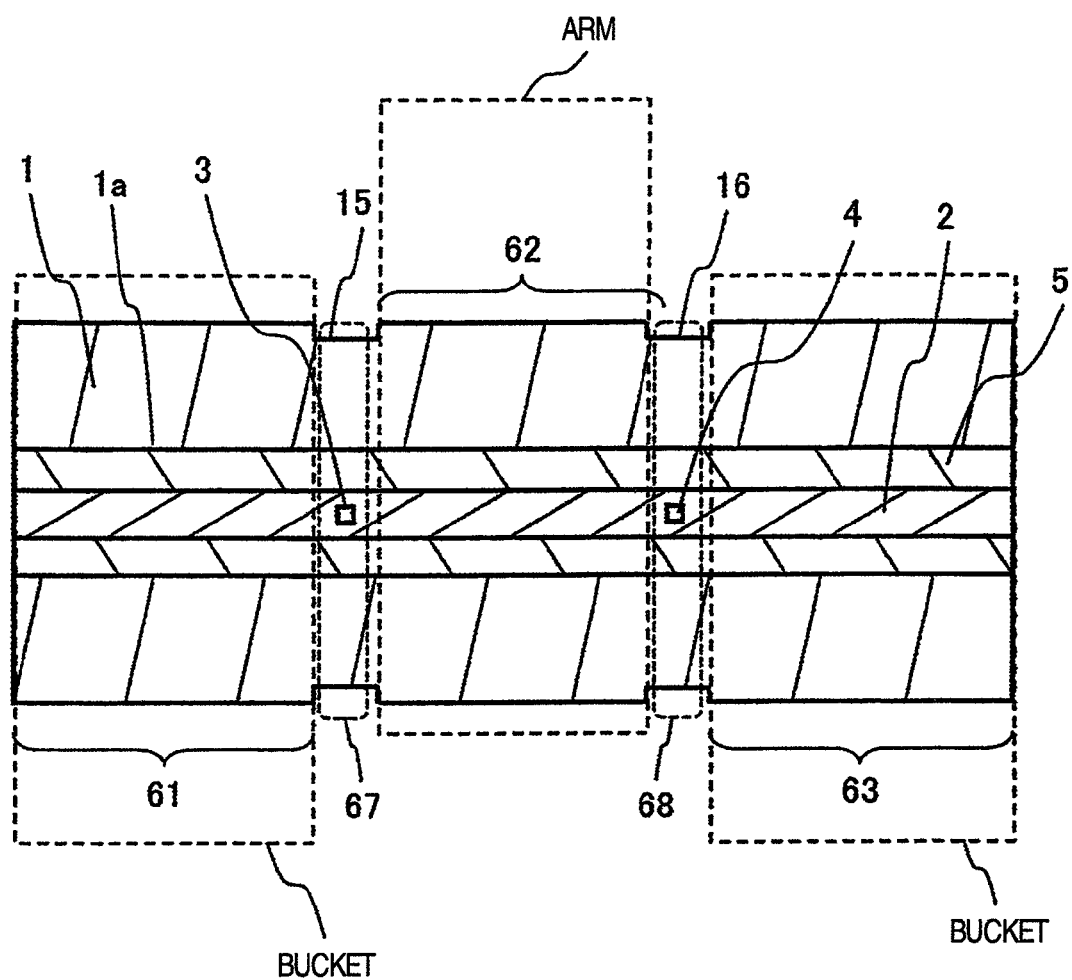
FIG. 19 is a view showing an applying method in the case that the load sensor in accordance with the present invention is applied to a shovel.

For example, in the case that the present load sensor is applied to a shovel, it is possible to detect an applied load of a bucket of the shovel by means of the present load sensor, by connecting the portion of the support surfaces 61 and 63 to the bucket, and connecting the portion of the load surface 62 to an arm, as shown in FIG. 19.

Figure 14:
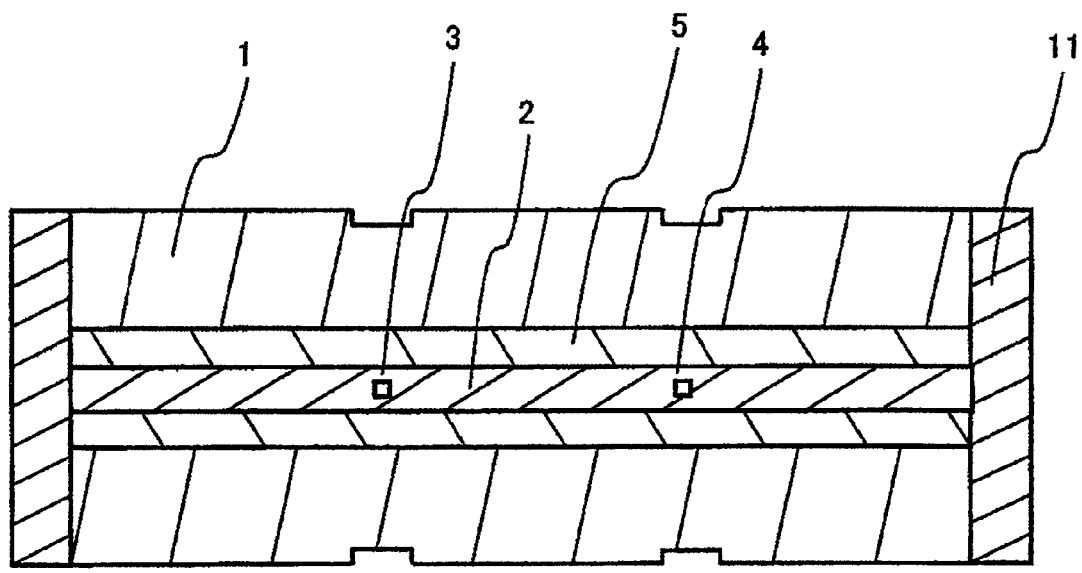
FIG. 14 is a view showing a modified example of the vertical cross sectional structure of the major portion of the load sensor in accordance with the first embodiment of the present invention.

In this case, the load sensor in the present embodiment shown in FIG. 1 is shown in a major part, and may be provided with a cover 11 in a side surface of the load sensor as shown in FIG. 14. For example, a cover made of a metal may be provided by a bolt fastening or the like. Accordingly, it is possible to inhibit a water content or the like from making an intrusion and it is possible to inhibit the shock relaxation material from being deteriorated.

Figure 15:
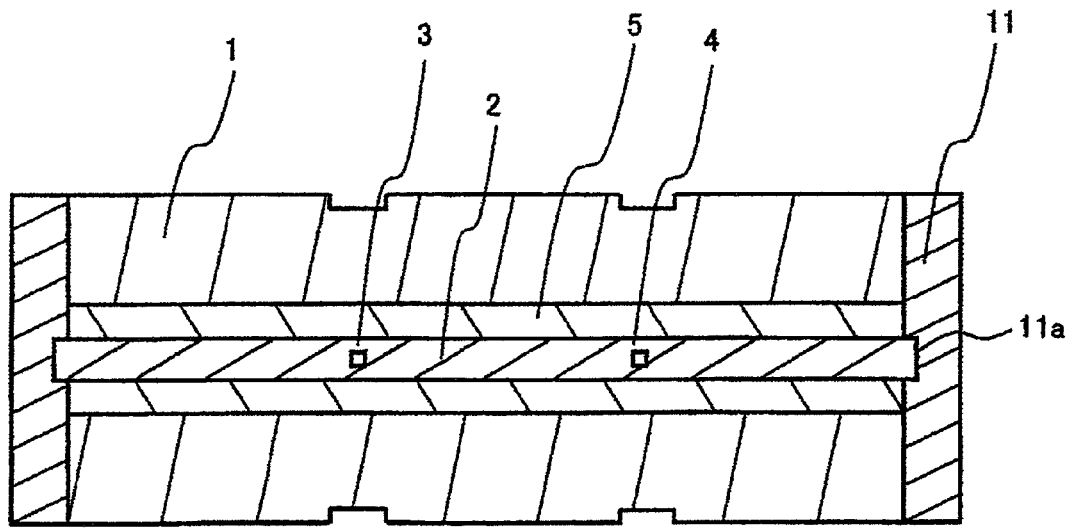
FIG. 15 is a view showing a modified example of the vertical cross sectional structure of the major portion of the load sensor in accordance with the first embodiment of the present invention.
Figure 16:
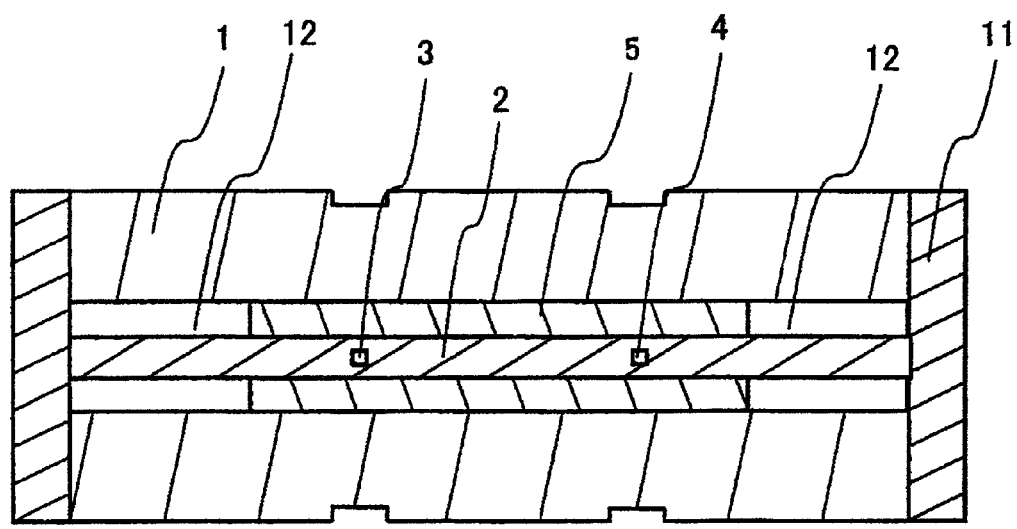
FIG. 16 is a view showing a modified example of the vertical cross sectional structure of the major portion of the load sensor in accordance with the first embodiment of the present invention.

Further, as shown in FIG. 15, it is possible to easily position the detection rod 2 by forming the groove 11*a* in such a manner as to come into contact with the inner side of the cover provided in the side surface of the load sensor, that is, the detection rod side. In other words, it is possible to easily position the detection rod 2 in the neutral axis of the pin by providing the groove 11*a* near the center of the cover, that is, near a crossing point to the neutral axis of the pin 1.

Further, it is not necessary to provide the shock relaxation material 5 provided in the inner portion of the pin wholly in the hole 1*a* of the pin, but the shock relaxation material 5 may be provided at least in the regions 67 and 68 in which the shear deformation is generated in the pin 1, the shock relaxation material 5 is provided in a part of the inner portion of the hole 1*a* of the pin 1, and the other portions may be formed as a cavity. In this case, there can be obtained an effect of preventing a deterioration of the shock relaxation material 5, by filling an inert gas 12.

Figure 17:
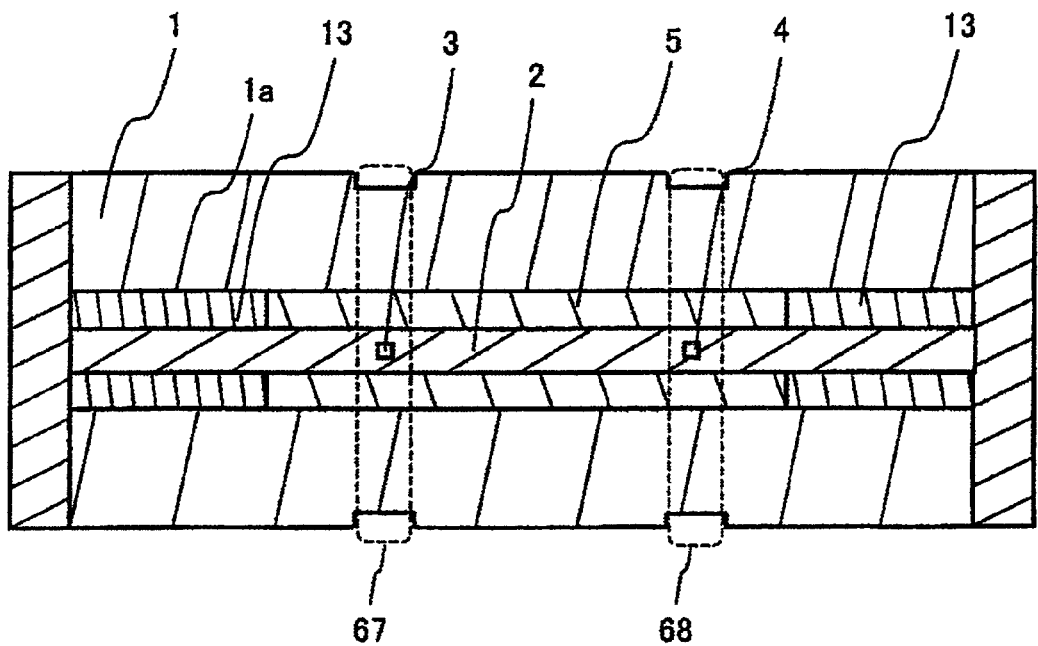
FIG. 17 is a view showing a modified example of the vertical cross sectional structure of the major portion of the load sensor in accordance with the first embodiment of the present invention.

Further, as shown in FIG. 17, the shock relaxation material 5 may be provided at least in the regions 67 and 68 in which the shear deformation is generated in the pin 1, and the other solid material 13 may be filled in the other portions.

Since it is possible to prevent the water content from making an intrusion into the shock relaxation layer by employing a drying agent such as a silica gel, or a material having a waterproofing effect such as a silicon rubber or the like, as the solid material 13, there is an advantage that it is possible to improve a reliability of the load sensor.

Figure 21:
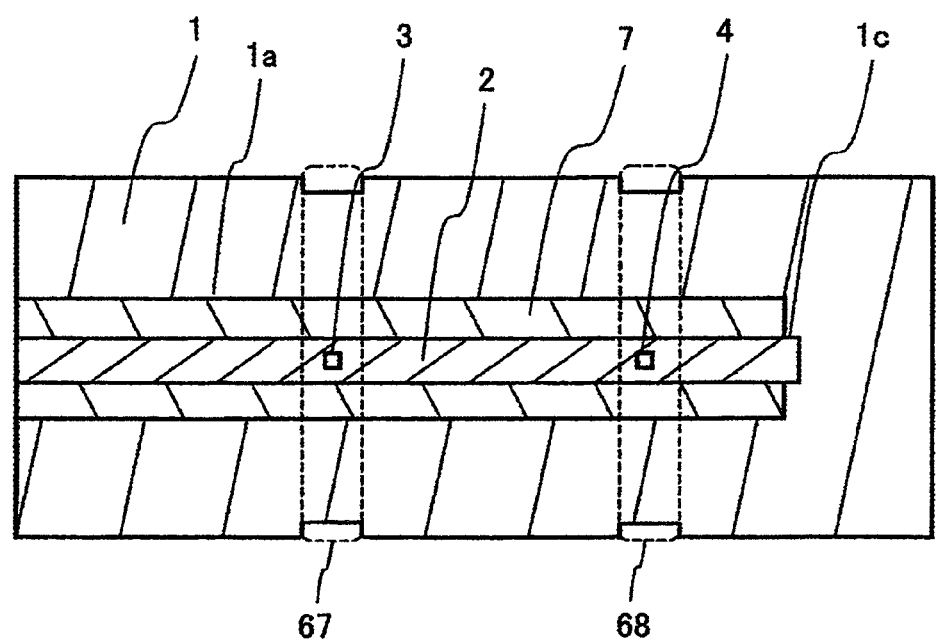
FIG. 21 is a view showing a modified example of the vertical cross sectional structure of the major portion of the load sensor in accordance with the first embodiment of the present invention.

Further, it is not necessary that the hole 1*a* of the pin provided in the pin 1 passes through the pin, but the hole 1*a* may be provided in such a manner as to pass at least through the regions 67 and 68 in which the shear deformation is generated in the pin 1. Since the hole 1*a* of the pin is provided from one side as shown in FIG. 21, there is an advantage that the shock relaxation material 5 is easily filled. Further, there is an advantage that it is possible to inhibit the water content from making an intrusion into the shock relaxation layer.

In this case, in the present embodiment shown in FIGS. 1 and 2, there is shown the case that two semiconductor strain sensors 3 and 4 are provided on the same surface of the detection rod 2, however, it is possible to detect the load by at least one semiconductor strain sensor. However, it is possible to calculate the load from an average of the outputs by setting two semiconductor strain sensors 3 and 4, and it is possible to detect the load at a higher precision.

Second Embodiment

Figure 3:
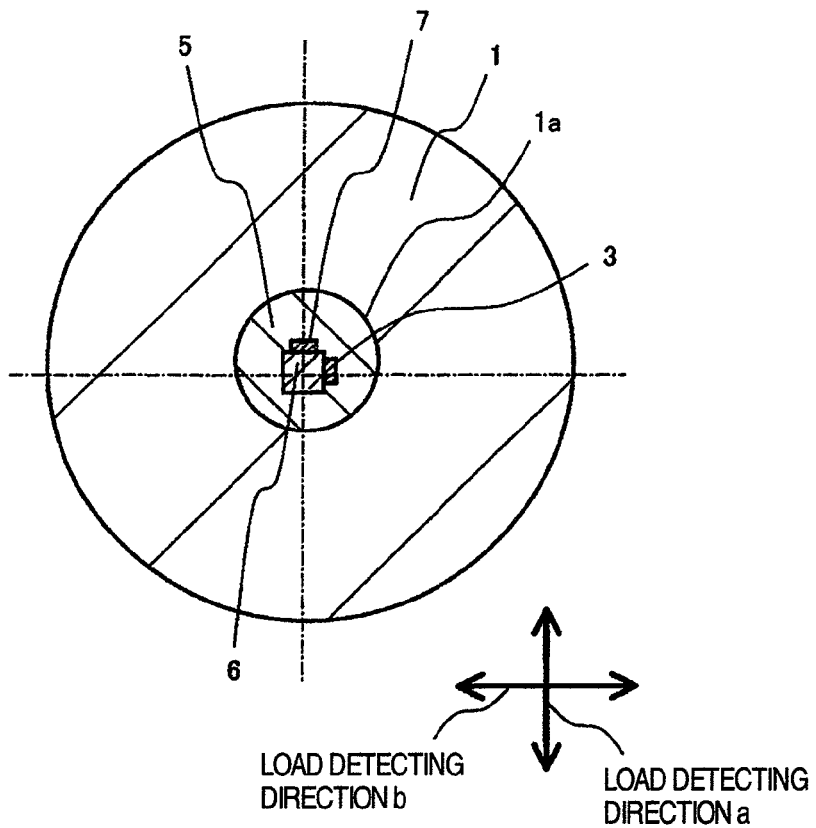
FIG. 3 is a view showing a transverse cross sectional structure of a major portion of a load sensor in accordance with a second embodiment of the present invention.

Next, a description will be given of a second embodiment in the present invention with reference to FIG. 3. FIG. 3 shows a modified example of a transverse cross sectional structure of the load sensor in accordance with the first embodiment, and the same reference numerals are attached to the common portions as the first embodiment.

The detection rod 2 of the load sensor in accordance with the first embodiment shown in FIG. 2 is formed as the flat plate shape, however, in the load sensor in FIG. 3, a detection rod 6 of a load sensor in accordance with the present embodiment is formed as a rectangular columnar shape. Further, a cross sectional shape of the detection rod 6 is a square rectangular columnar shape, and the semiconductor strain sensors 3 and 7 are respectively provided in two orthogonal surfaces of the rectangular column. As mentioned above, it is possible to detect the loads in two orthogonal directions respectively separately by forming the detection rod 6 as the rectangular columnar shape and providing the strain sensors in two orthogonal surfaces, and there is an advantage that it is possible to calculate a direction and a magnitude of the load in an optional direction on the basis of two output results obtained from these two sensors.

Further, since the structure of the pin becomes isotropic with respect to two load detecting directions, by setting the cross sectional shape of the detection rod to the square shape, there is an advantage that the sensitivity with respect to the load become uniform.

Further, in the case that the detection rod is provided with two semiconductor strain sensors, it is preferable to have a power supply line of these two semiconductor strain sensors in common in the inner portion of the pin.

Figure 20:
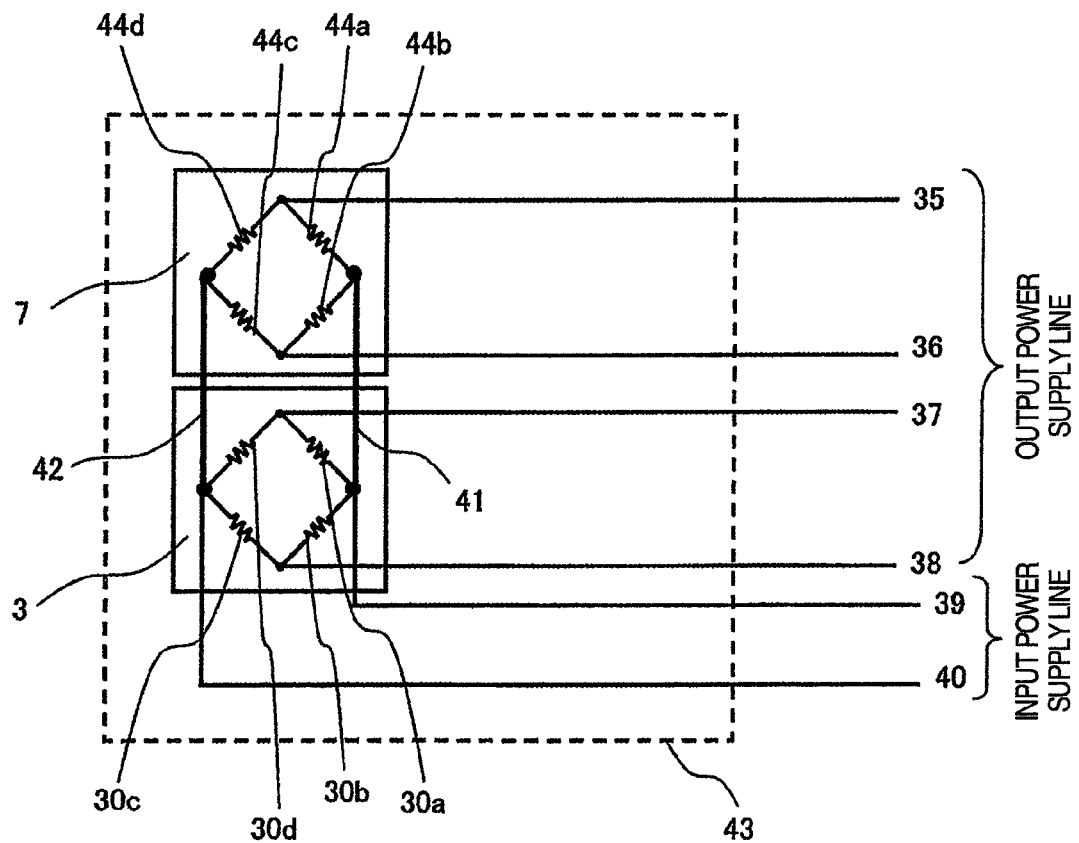
FIG. 20 is a view showing a wiring diagram of two semiconductor strain sensors.

In other words, as shown in a wiring diagram of FIG. 20, the bridge circuit constituted by the diffusion layers 30a, 30b, 30c and 30d of the semiconductor strain sensor 3 is electrically connected to the bridge circuit constituted by diffusion layers 44a, 44b, 44c and 44d of the semiconductor strain sensor 7 by wirings 41 and 42 in a pin inner portion 43. Further, the wirings 41 and 42 electrically connecting both the bridges are electrically connected to a power supply in an outer portion of the pin by input power supply lines 39 and 40. As mentioned above, it is possible to reduce the number of the wirings drawn out to the outer portion of the pin by having the input power supply line electrically connected to the bridge circuit of the semiconductor strain sensor in common in the pin inner portion, and it is possible to suppress a void generated in the shock relaxation material at a time of setting the shock relaxation material between the detection rod and the pin inner wall. On the basis of the suppression of the void, there is an advantage that a linearity of the strain sensor output to the load of the load sensor is improved.

Third Embodiment

Figure 4:
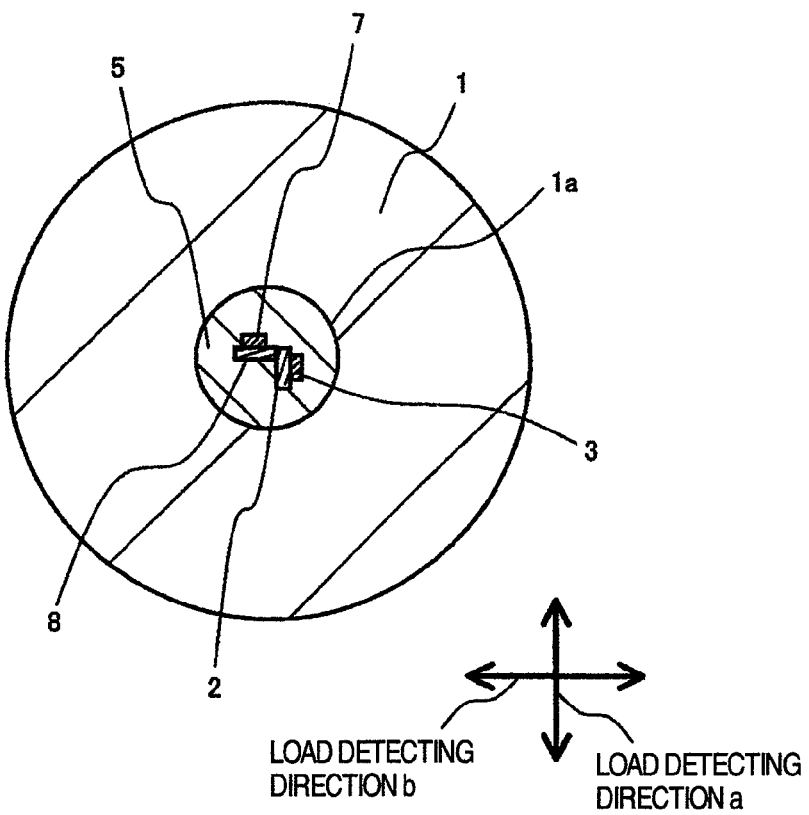
FIG. 4 is a view showing a transverse cross sectional structure of a major portion of a load sensor in accordance with a third embodiment of the present invention.
Figure 5:
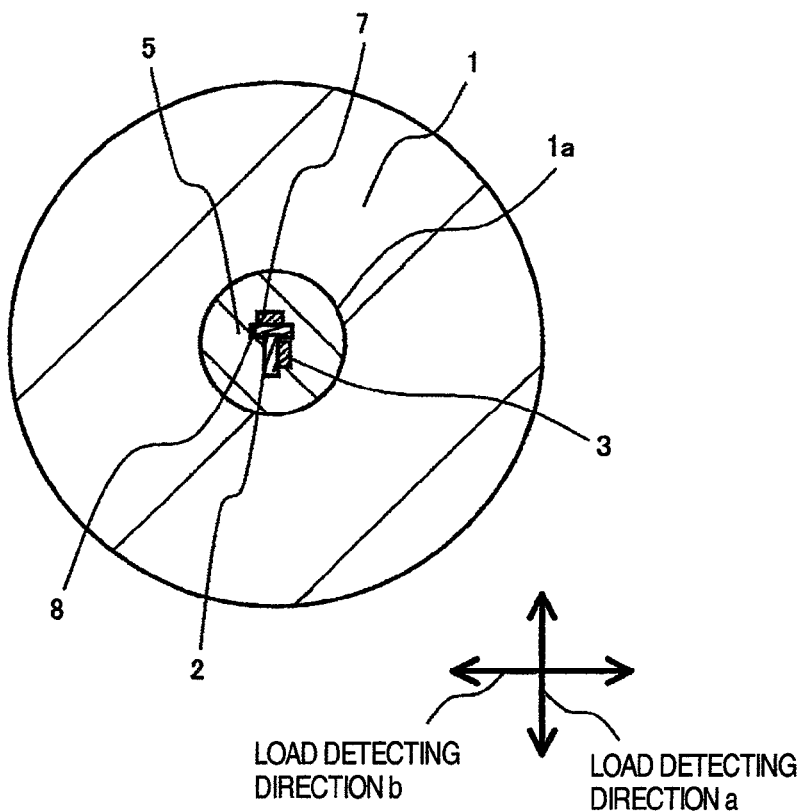
FIG. 5 is a view showing a modified example of the transverse cross sectional structure of the major portion of the load sensor in accordance with the third embodiment of the present invention.

Next, a description will be given of a third embodiment in the present invention with reference to FIGS. 4 and 5. FIGS. 4 and 5 show a modified example of a transverse cross sectional structure of the load sensor in accordance with the second embodiment, and the same reference numerals are attached to the common portions as the second embodiment.

The detection rod 6 of the load sensor in accordance with the second embodiment shown in FIG. 3 is formed as the rectangular columnar shape, and two semiconductor strain sensors 3 and 7 are provided in two orthogonal surfaces of the rectangular column, however, in the load sensor in FIGS. 4 and 5 in accordance with the present embodiment, the semiconductor strain sensors 3 and 7 are respectively provided in the flat plate shaped detection rods 2 and 8. In this case, the surfaces provided with two detection rods 2 and 8 are respectively arranged so as to be in parallel to the load detecting directions a and b.

FIG. 4 shows an example in which two detection rods 2 and 8 are provided as an L-shaped form at right angles, and FIG. 5 shows an example in which the detection rods are provided as a T-shaped form at right angles. In this case, it is preferable to arrange these detection rods 2 and 8 near the neutral axis.

In the case that the detection rod is formed as the flat plate shape, and two detection rods are combined, such as the present embodiment shown in FIGS. 4 and 5, the rigidity of the detection rod becomes small in comparison with the rectangular column. Accordingly, the strain tends to be generated, and this structure is effective in the case of the pin type load sensor detecting the small load.

In this case, in the present embodiment, the description is given of the case that the detection rods 2 and 8 are formed as the flat plate shape, and these two detection rods are used, however, it is not necessary that the detection rods 2 and 8 are separated into two pieces, but the detection rods 2 and 8 may be integrated. In other words, it is possible to use a detection rod in which the transverse cross sectional surface is formed as an L-shaped form, or a T-shaped detection rod.

Fourth Embodiment

Figure 6:
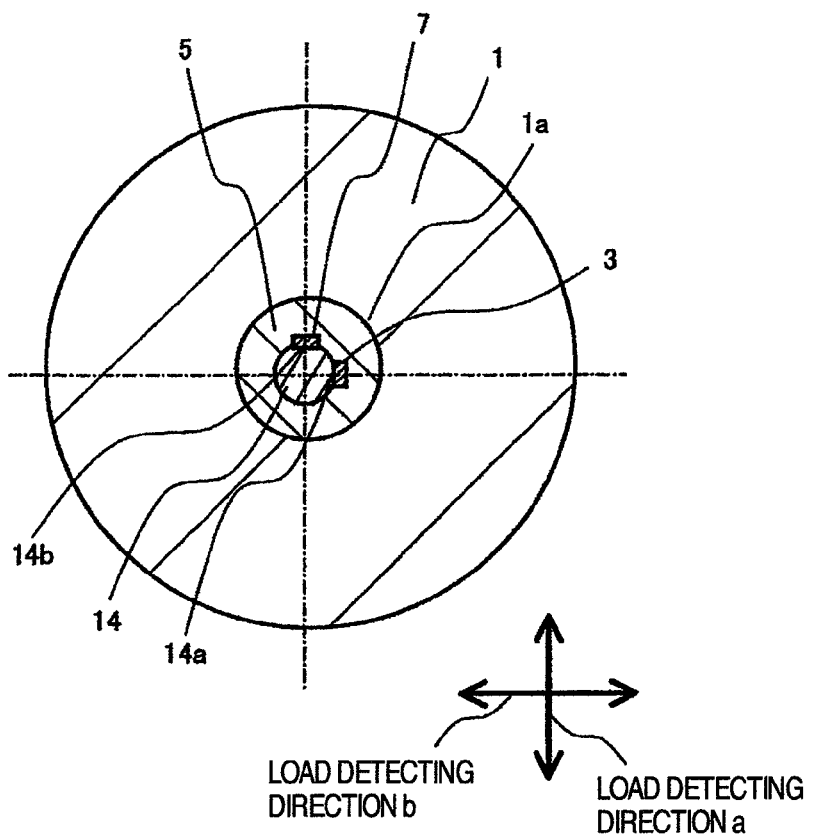
FIG. 6 is a view showing a transverse cross sectional structure of a major portion of a load sensor in accordance with a fourth embodiment of the present invention.

Next, a description will be given of a fourth embodiment in the present invention with reference to FIG. 6. FIG. 6 shows a modified example of the transverse cross section structure of the load sensor in accordance with the second embodiment, and the same reference numerals are attached to the common portions as the second embodiment.

In the load sensor in FIG. 6, the detection rod 6 of the load sensor in accordance with the second embodiment shown in FIG. 3 is formed as a rectangular columnar shape, and two semiconductor strain sensors 3 and 7 are respectively provided in two orthogonal surfaces of the rectangular column, however, in the load sensor in accordance with the present embodiment, a detection rod 14 is formed as a circular columnar shape, and two semiconductor strain sensors 3 and 7 are provided so as to be orthogonal. In this case, a flat surface portion 14a is provided near a portion provided with the semiconductor strain sensor. The flat surface portion 14a is not always necessary, however, there is an advantage that the semiconductor strain sensor is easily provided in the detection rod 14, and a peeling is suppressed.

As shown in the present embodiment, there is an advantage that an isotropic structure is formed with respect to an outer peripheral direction of the pin by forming the detection rod as the columnar shape, and a precision of measurement can be improved.

Fifth Embodiment

Figure 12:
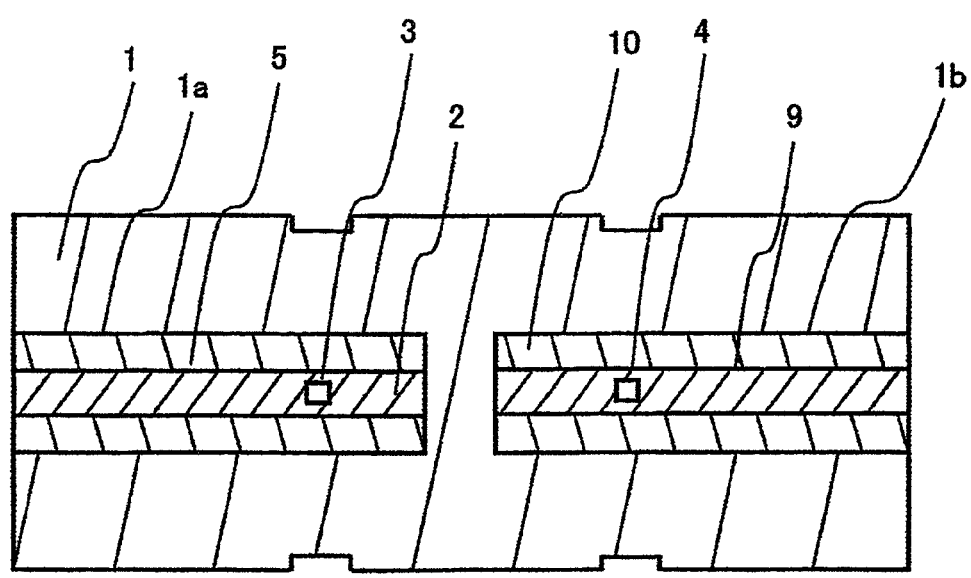
FIG. 12 is a view showing a transverse cross sectional structure of a major portion of a load sensor in accordance with a fifth embodiment of the present invention.

Next, a description will be given of a fifth embodiment in the present invention with reference to FIG. 12. FIG. 12 shows a modified example of the vertical cross sectional structure of the load sensor in accordance with the first embodiment, and the same reference numerals are attached to the common portions as the first embodiment.

In the load sensor in accordance with the first embodiment shown in FIG. 1, only one hole 1a is provided in the pin 1, however, in a load sensor shown in FIG. 12, two holes 1a and 1b are provided from both sides of the pin 1, and the detection rods 2 and 9 are provided near centers of the hole inner portions. Further, the semiconductor strain sensors 3 and 4 are provided respectively in the detection rods 2 and 9.

As shown in the present embodiment, since a depth of the hole can be made shallow by providing the holes 1a and 1b in a two-separated manner from both sides of the pin 1, there is an advantage that it is easy to work.

Figure 13:
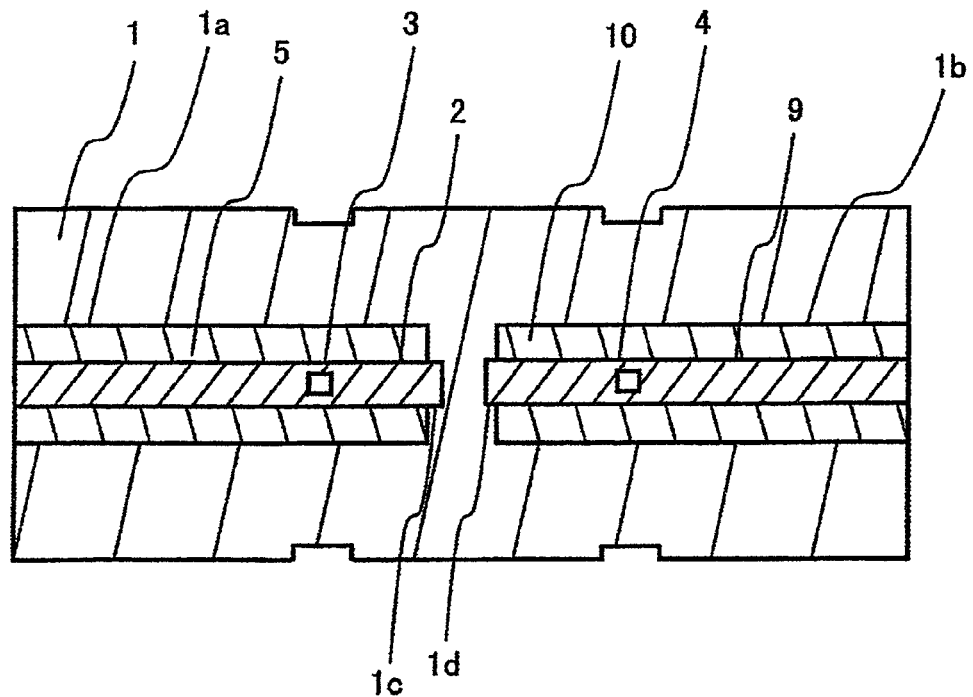
FIG. 13 is a view showing a modified example of the transverse cross sectional structure of the major portion of the load sensor in accordance with the fifth embodiment of the present invention.

Further, there is an advantage that it is easy to arrange the detection rods 2 and 9 near the neutral axis of the pin 1 by providing shallow grooves 1c and 1d capable of inserting the detection rods in bottoms of the holes 1a and 1b, as shown in FIG. 13.

As mentioned above, in accordance with the load sensors on the basis of the present invention shown in the first to fifth embodiments, since the structure of the detection rod is simple, and the manufacturing method can be simplified, there is an advantage that the pin type load sensor can be inexpensively manufactured. Further, since the semiconductor strain sensor having the high strain sensitivity is used as the strain measuring apparatus, there is an advantage that it is not necessary to amplify the signal by the amplifier or the like, and it is possible to lower a cost as a whole of the load sensor system. Further, in the case of the load sensor utilizing the strain gauge, there is the problem that the wiring from the strain gauge to the amplifier tends to be affected by the noise and the SN ratio is lowered, however, in the case of the semiconductor strain sensor, since the strain sensitivity is high and the output of the sensor is great, the semiconductor strain sensor is hard to be affected by the noise, and it is possible to inhibit the SN ratio from being lowered.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A load sensor comprising:
   a pin including a hole provided in a region including a neutral axis;
   a detection rod provided in an inner portion of said hole;
   a semiconductor strain sensor provided in said detection rod; and
   a shock relaxation material provided between said detection rod and said pin in the inner portion of said hole so as to be between said semiconductor strain sensor and said pin,
   wherein Young's modulus of said shock relaxation material is lower than Young's modulus of said pin and said detection rod.

2. A load sensor as claimed in claim 1, wherein said detection rod is provided in the region including the neutral axis of said pin.

3. A load sensor as claimed in claim 1, wherein power supply lines of semiconductor strain sensors which are formed respectively in two orthogonal surfaces of the detection rod are held in common in the inner portion of the pin, and the number of wirings drawn out to an outer portion of the pin from said respectively formed semiconductor strain sensors is obtained by a formula (number of sensors×2)+2.

4. A load sensor as claimed in claim 1, wherein a material of said shock relaxation material includes an epoxy resin.

5. A load sensor as claimed in claim 1, wherein a material of said detection rod includes a metal.

6. A load sensor as claimed in claim 1, wherein a material comprising said detection rod is the same as a material comprised of said pin.

7. A load sensor as claimed in claim 1, wherein a cross sectional shape of said detection rod is a square.

8. A load sensor as claimed in claim 1, wherein a cross sectional shape of said detection rod is a flat plate.

9. A load sensor as claimed in claim 1, wherein a longitudinal direction of the detection rod is in parallel to a longitudinal direction of the pin.

10. A load sensor as claimed in claim 1, wherein said semiconductor strain sensor is provided in such a manner as to detect a shear strain of said detection rod.

11. A load sensor as claimed in claim 1, wherein said semiconductor strain sensor is provided with a diffusion layer on a surface of a silicon substrate, and is constructed by a bridge circuit constituted by four diffusion layers on the same substrate surface.

12. A load sensor as claimed in claim 11, wherein the diffusion layer formed on the surface of said silicon substrate is constituted by a P type diffusion layer, and the bridge circuit is constructed by two diffusion resistances in which a longitudinal direction of said P type diffusion layer is in parallel to a direction <110> of a silicon single crystal, and two P type diffusion layers which are perpendicular thereto.

13. A load sensor as claimed in claim 12, wherein the direction <110> of the silicon single crystal of said strain sensor is arranged in parallel to a direction of 45 degree with respect to the longitudinal direction of the pin.

14. A load sensor as claimed in claim 1, further comprising a second semiconductor strain sensor, wherein the detection rod is constituted by a rectangular column having a square cross sectional shape, and the semiconductor strain sensor and the second semiconductor strain sensor are provided in two orthogonal surfaces of said rectangular columns.

15. A load sensor comprising:
   a pin having a hole provided in a region including a neutral axis;
   a detection rod provided in an inner portion of said hole;
   a semiconductor strain sensor provided in said detection rod; and
   a shock relaxation material provided between said detection rod and said pin in the inner portion of said hole;
   wherein said semiconductor strain sensor is provided with a diffusion layer on a surface of a silicon substrate, and is constructed by a bridge circuit constituted by four diffusion layers on the same substrate surface;
   wherein the diffusion layer formed on the surface of said silicon substrate is constituted by a P type diffusion layer, and the bridge circuit is constructed by two diffusion resistances in which a longitudinal direction of said P type diffusion layer is in parallel to a direction <110> of a silicon single crystal, and two P type diffusion layers which are perpendicular thereto; and
   wherein the direction <110> of the silicon single crystal of said strain sensor is arranged in parallel to a direction of 45 degree with respect to the longitudinal direction of the pin.

16. A load sensor as claimed in claim 1, wherein the detection rod is constituted by a circular column, and the strain sensor is provided at least on one surface of said circular column.

17. A manufacturing method of a load sensor comprising:
   a step of attaching a semiconductor strain sensor to a detection rod;
   a step of inserting the detection rod attaching said semiconductor strain sensor thereto into a hole provided in a region including a center shaft of a pin; and
   a step of filling a resin, having a lower Young's modulus than the Young's modulus of said pin detection rod, in the hole of said pin so as to form a shock relaxation material between said semiconductor strain sensor and said pin.

18. A load sensor as claimed in claim 15, wherein two or more strain sensors are provided and wherein power supply lines of said two or more strain sensors are held in common in the inner portion of the pin, and the number of the wirings drawn out to an outer portion of the pin from said two or more strain sensors is obtained by a formula (number of sensors×2)+2.

* * * * *